US011685268B2

(12) United States Patent
Sjöholm (10) Patent No.: US 11,685,268 B2
(45) Date of Patent: Jun. 27, 2023

(54) CHASSIS ARRANGEMENT FOR ELECTRIFIED HEAVY VEHICLE AND ELECTRIFIED HEAVY VEHICLE

(71) Applicant: Volvo Truck Corporation, Gothenburg (SE)

(72) Inventor: Martin Sjöholm, Vaxjo (SE)

(73) Assignee: Volvo Truck Corporation, Gothenburg (SE)

( * ) Notice: Subject to any disclaimer, the term of this patent is extended or adjusted under 35 U.S.C. 154(b) by 76 days.

(21) Appl. No.: 17/345,306

(22) Filed: Jun. 11, 2021

(65) Prior Publication Data

US 2021/0387534 A1    Dec. 16, 2021

(30) Foreign Application Priority Data

Jun. 16, 2020 (EP) ..................................... 20180339

(51) Int. Cl.
    *B60L 50/60*     (2019.01)
    *B60K 1/04*     (2019.01)
    *B62D 21/02*     (2006.01)
    *B62D 27/02*     (2006.01)

(52) U.S. Cl.
    CPC ................ *B60L 50/66* (2019.02); *B60K 1/04* (2013.01); *B62D 21/02* (2013.01); *B62D 27/02* (2013.01); *B60K 2001/0405* (2013.01)

(58) Field of Classification Search
    CPC ............ B60L 50/66; B60K 2001/0438; B60K 2001/0461; B60K 1/04; B62D 27/06; B62D 21/02; B62D 21/03
See application file for complete search history.

(56) References Cited

U.S. PATENT DOCUMENTS 4,883,725 A    11/1989   Gerard
5,501,504 A *   3/1996   Kunz ................. B62D 25/2054
                                                                                 280/783

(Continued)

FOREIGN PATENT DOCUMENTS

CN        206456437 U    9/2017
CN        208484529 U    2/2019

(Continued)

OTHER PUBLICATIONS

Extended European Search Report for European Patent Application No. 20180339.2, dated Nov. 17, 2020, 7 pages.

(Continued)

*Primary Examiner* — Jeffrey J Restifo
(74) *Attorney, Agent, or Firm* — Withrow & Terranova, PLLC (57) ABSTRACT

The invention relates to a chassis arrangement for an electrified heavy vehicle, the chassis arrangement comprising a chassis frame with at least one rail extending in a longitudinal direction of the chassis arrangement; at least one battery module for propulsion of the heavy vehicle; and a battery module support arrangement including a rail attachment part attached to the rail, and a battery module attachment part attached to the battery module, the battery module attachment part being releasably connected to the rail attachment part by a stub connection extending perpendicular to the longitudinal direction of the chassis arrangement.

10 Claims, 9 Drawing Sheets

(56) References Cited

U.S. PATENT DOCUMENTS

| | | | | |
|---|---|---|---|---|
| 6,641,206 | B1* | 11/2003 | Bergstrom | B62D 29/008 296/184.1 |
| 10,493,837 | B1* | 12/2019 | Angelo | B60L 50/66 |
| 11,124,076 | B1* | 9/2021 | Borghi | B60L 50/66 |
| 11,400,829 | B1* | 8/2022 | Hajimiri | B60L 53/68 |
| 2011/0174561 | A1* | 7/2011 | Bowman | B60L 50/64 180/65.245 |
| 2012/0097466 | A1 | 4/2012 | Usami et al. | |
| 2014/0166381 | A1* | 6/2014 | Ling | H01M 50/271 180/68.5 |
| 2018/0201110 | A1* | 7/2018 | Yin | B60L 50/64 |
| 2019/0382050 | A1* | 12/2019 | Alla | F16B 7/185 |
| 2020/0259143 | A1* | 8/2020 | Sloan | H01M 50/204 |
| 2021/0094400 | A1* | 4/2021 | Loacker | B60K 1/04 |
| 2021/0155224 | A1* | 5/2021 | McKibben | B62D 21/09 |
| 2021/0188069 | A1* | 6/2021 | Friedman | H01M 50/20 |
| 2021/0284005 | A1* | 9/2021 | Yun | H01M 50/264 |
| 2021/0362579 | A1* | 11/2021 | Kumagai | B60K 1/04 |
| 2021/0380001 | A1* | 12/2021 | Hörder | H01M 10/6557 |
| 2021/0387519 | A1* | 12/2021 | Landvik | B62D 21/02 |
| 2021/0387534 | A1* | 12/2021 | Sjöholm | B62D 21/02 |
| 2022/0097537 | A1* | 3/2022 | Prothery | H01M 50/242 |
| 2022/0105815 | A1* | 4/2022 | Björkman | B60L 50/64 |
| 2022/0111716 | A1* | 4/2022 | McKibben | B60L 8/003 |
| 2022/0111717 | A1* | 4/2022 | Hendriks | H01M 50/289 |
| 2022/0126706 | A1* | 4/2022 | Ragot | B60L 50/66 |
| 2022/0161680 | A1* | 5/2022 | Landvik | H01M 50/244 |
| 2022/0185089 | A1* | 6/2022 | Hendriks | B60K 15/063 |
| 2022/0281306 | A1* | 9/2022 | Landvik | B60K 1/04 |

FOREIGN PATENT DOCUMENTS

| | | |
|---|---|---|
| DE | 102015015504 A1 | 6/2016 |
| DE | 102017007490 A1 | 2/2019 |
| DE | 102019005927 A1 | 2/2020 |
| EP | 2938530 A1 | 11/2015 |
| EP | 3103666 A1 | 12/2016 |
| WO | 2014100863 A1 | 7/2014 |
| WO | 2020074105 A1 | 4/2020 |

OTHER PUBLICATIONS

Extended European Search Report for European Patent Application No. 20180282.4, dated Nov. 16, 2020, 8 pages.

Non-Final Office Action for U.S. Appl. No. 17/345,736, dated Feb. 17, 2023, 17 pages.

* cited by examiner

CHASSIS ARRANGEMENT FOR ELECTRIFIED HEAVY VEHICLE AND ELECTRIFIED HEAVY VEHICLE

The present application claims priority to European Patent Application No. 20180339.2, filed on Jun. 16, 2020, and entitled "CHASSIS ARRANGEMENT FOR ELECTRIFIED HEAVY VEHICLE AND ELECTRIFIED HEAVY VEHICLE," which is incorporated herein by reference in its entirety.

TECHNICAL FIELD

The invention relates to a chassis arrangement for an electrified heavy vehicle and to a heavy vehicle comprising such a chassis arrangement.

The invention can be applied in heavy-duty vehicles, such as trucks, buses, and construction equipment. Although the invention will be described with respect to a truck, the invention is not restricted to this particular vehicle but may also be used in other vehicles, for instance, buses or construction vehicles, such as bulldozers or excavators.

BACKGROUND

One challenge in the development of electrified heavy vehicles lies in the attachment of the propulsion batteries to the frame of the vehicle. Using currently available battery technology, the batteries become considerably heavier than subsystem that is attached to the frame in conventionally powered heavy vehicles. This means that the requirements on the connection between the batteries and the frame are particularly severe since electrified trucks should exhibit satisfactory behavior during normal operation, as well as in the event of a collision.

SUMMARY

An object of the invention is to provide for satisfactory behavior during normal operation, as well as in the event of a collision of an electrified heavy vehicle in which a propulsion battery is supported by the chassis frame.

According to the invention, this object is achieved by a chassis arrangement for an electrified heavy vehicle, the chassis arrangement comprising: a chassis frame with at least one rail extending in a longitudinal direction of the chassis arrangement; at least one battery module for propulsion of the heavy vehicle; and a battery module support arrangement including a rail attachment part attached to the rail, and a battery module attachment part attached to the battery module, the battery module attachment part being releasably connected to the rail attachment part by a stub connection extending perpendicular to the longitudinal direction of the chassis arrangement.

The present invention is based on the realization that a battery module support arrangement including parts releasably joined together by a stub connection can provide a very strong suspension of the battery module(s) used for propulsion of the electrified heavy vehicle, while at the same time facilitating production of the electrified heavy vehicle. Accordingly, embodiments of the present invention provide for improved safety and a more efficient production process for manufacturing the chassis arrangement. In addition, maintenance and replacement of battery modules are facilitated.

Due to the configuration of the longitudinally extending rail(s) comprised in the chassis frame, it may be necessary or at least beneficial to attach the battery module support arrangement to the rail at least partly using riveting. The reason for this is that a riveted connection has a greater ability to withstand shear load than, for example, a bolted connection. However, to form a riveted connection, the use of relatively bulky equipment would typically be needed, making it cumbersome and time-consuming to form the riveted connection at a stage in the manufacturing process where there is not much space available at the rail. By providing the battery module support arrangement as a combination of separate parts releasably joined together, the rail attachment part can be made relatively small, and light and can be attached to the rail at a relatively early stage of the manufacturing process. It may then be relatively easy to operate riveting equipment, providing for reduced time and effort spent on the assembly.

At a later appropriate stage of the manufacturing process, the battery module attachment part can conveniently be joined to the rail attachment part by means of a stub connection extending perpendicularly to the longitudinal direction of the rail. As has been realized by the present inventor, a stub connection provides an advantageous combination of ability to withstand large loads in a direction perpendicular to the extension of the stub connection and ease of handling in the joining procedure. Moreover, the weight handled by the operator can be reduced as compared to providing the battery module support arrangement as a single integral part. By providing the connection between the rail attachment part and the battery module attachment part as a stub connection, the joining of the parts, including alignment and fastening, can be made convenient and efficient. The mating can be made simple, and fastening can be achieved by a single, or only a few, fastening elements.

According to embodiments, the stub connection may advantageously extend laterally, that is, sideways. This direction is generally referred to as the Y-direction in the context of vehicle dynamics. This arrangement may simplify the manufacturing process and improve the abilities of the stub connection to carry loads in the X-direction (the longitudinal direction of the chassis arrangement/vehicle) and the Z-direction (the vertical direction).

The stub connection may include a stub inserted in and releasably attached to a stub seat. The stub may be included in one of the rail attachment parts and the battery module attachment part, and the stub seat may be included in the other one of the rail attachment part and the battery module attachment part. For ease of assembly, it may be beneficial if the battery module attachment part includes the stub and the rail attachment part includes the stub seat.

Furthermore, the stub connection may include locking means for locking the stub in the stub seat. The locking means may be any means suitable for restricting movement of the stub in relation to the stub seat, in particular movement along the axial extension of the stub connection and/or rotation of the stub in relation to the stub seat. To that end, the locking means may be at least partly embodied by complementary shapes of the stub and the stub seat and/or (of course) by various conventional locking means, including various kinds of bolts, etc.

For beneficial load-carrying properties of the stub connection, a cross-section between the stub and a plane perpendicular to an axial extension of the stub connection may advantageously form a continuous closed curve. This may provide for the use of a tubular stub, which may substantially reduce the mass of the part, including the stub. This may be particularly beneficial in embodiments where the battery module attachment part includes the stub.

According to embodiments, the closed curve may be elliptical. In various such embodiments, the closed curve may be circular. Accordingly, the stub may be generally cylindrical or conical. Such a configuration may provide for particularly good load carrying capabilities in the relevant directions.

According to various embodiments, the stub may have a first portion along the axial extension of the stub connection in which the cross-section between the stub and a plane perpendicular to the axial extension is circular, and a second portion along the axial extension of the stub connection in which the cross-section between the stub and a plane perpendicular to the axial extension is non-circular; and the stub seat may have a portion configured to accommodate the second portion of the stub in such a way that rotation of the stub in relation to the stub seat is prevented by interaction between the second portion of the stub and the portion of the stub seat. This configuration of the stub connection may be included in the above-mentioned locking means for locking the stub in the stub seat.

According to embodiments, the closed curve may form a polygon with rounded corners. A triangle with rounded corners may be particularly beneficial. The entire stub may have such a cross-section, or only a portion of the stub may have such a cross-section. In the latter case, the portion of the stub with a rounded polygonal cross-section may serve to prevent rotation of the stub in relation to the stub seat.

In embodiments, the rail attachment part may be attached to the rail by a bolted connection, a riveted connection, or a combination of a bolted and a riveted connection.

According to various embodiments, furthermore, the chassis arrangement may comprise a rear axle and a reaction rod having a first end coupled to the rear axle; and the rail attachment part may include a reaction rod holder holding a second end of the reaction rod. In these embodiments, the battery module support arrangement may provide the dual functionalities of supporting the battery module and anchoring the reaction rod.

The chassis arrangement, according to various embodiments of the present invention, may be comprised in an electrified heavy vehicle, further comprising a vehicle body supported by the chassis arrangement.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1A:
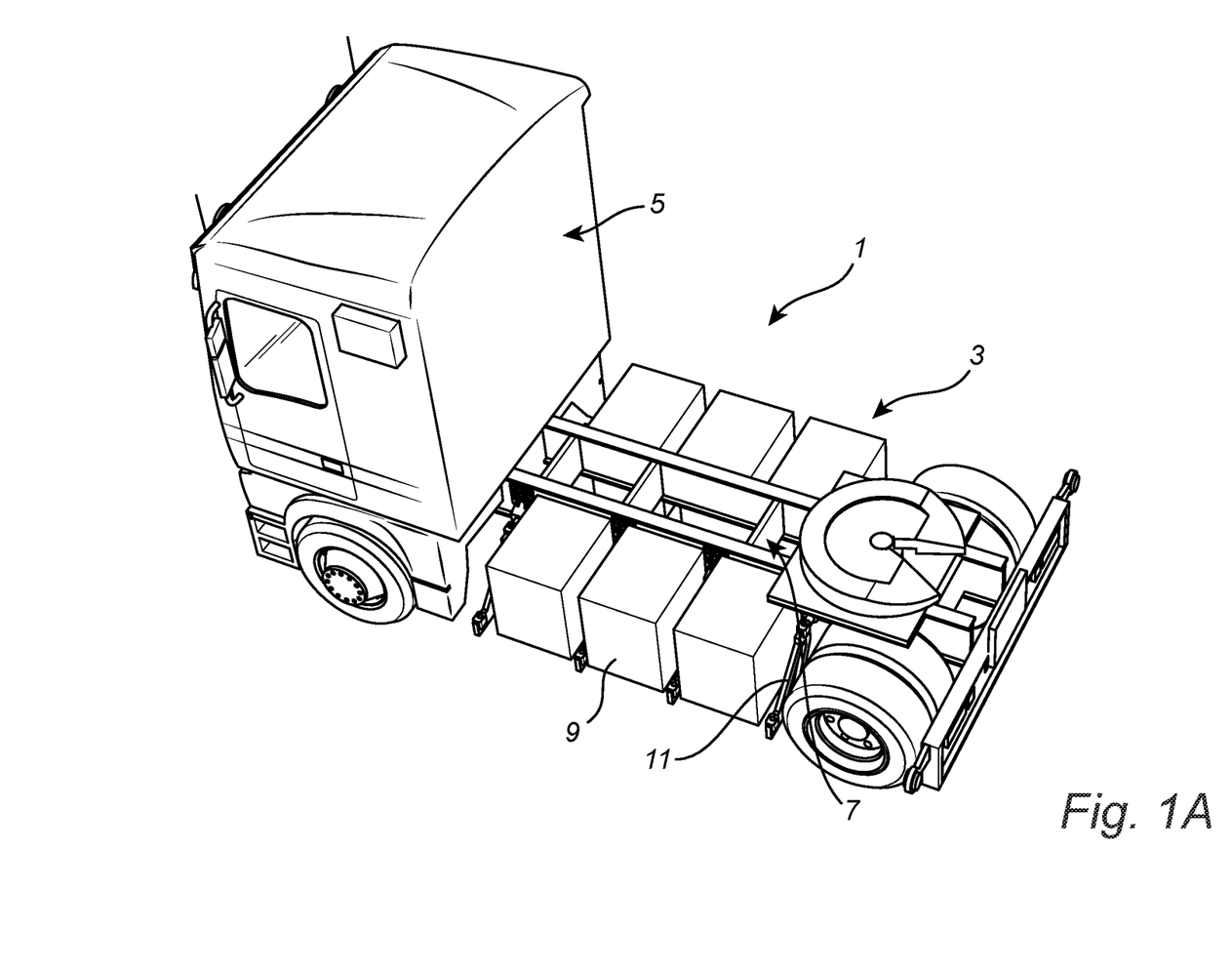
FIG. 1A is a perspective view of an electrified heavy vehicle according to an embodiment of the present invention, in the form of a truck comprising a chassis arrangement according to an example embodiment of the present invention.

FIG. 1A schematically shows an electrified heavy vehicle, here in the form of a truck 1, comprising a chassis arrangement 3 and a vehicle body 5 supported by the chassis arrangement 3. As is schematically indicated in FIG. 1A, the chassis arrangement 3 comprises a chassis frame 7, battery modules 9, and battery module support arrangements 11. Only one of the battery modules and only one of the battery module support arrangements are indicated by reference numerals to avoid cluttering the drawings.

Figure 1B:
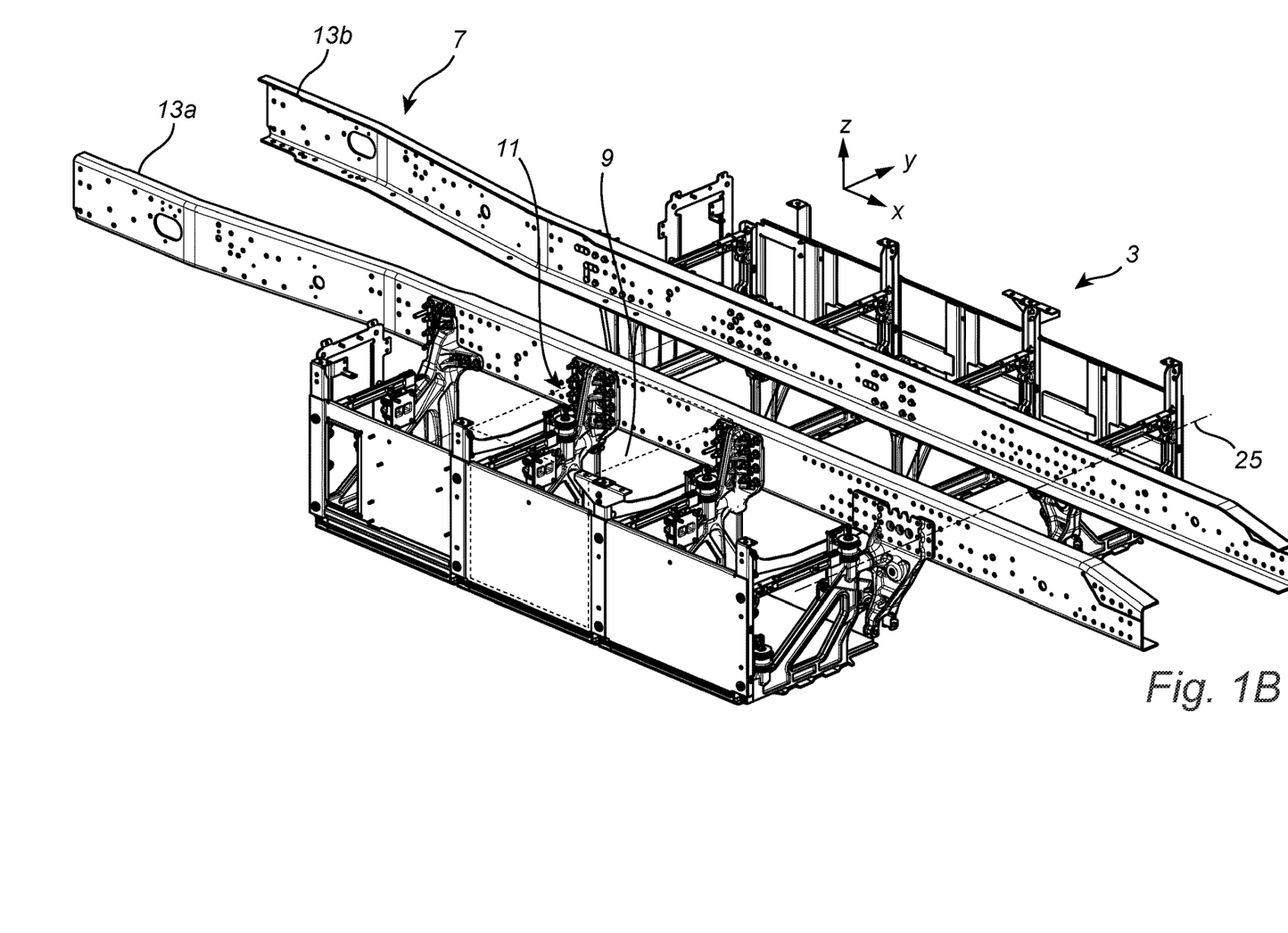
FIG. 1B is a schematic partial view of chassis arrangement in FIG. 1A.

FIG. 1B schematically shows a part of the chassis arrangement 3 in FIG. 1A, with the battery modules 9 partially removed (no battery cells, etc.) to provide a better view of the battery module support arrangements 11. As can be seen in FIG. 1B, the chassis frame 7 comprises rails 13a-b extending in the longitudinal direction (the X-direction) of the chassis arrangement 3. Each battery module support arrangement 11 is attached to one of the rails 13a-b and one or two battery modules 9. Due to the weight of the battery modules 9, the battery module support arrangements 11 are designed to withstand substantial loads, such as may occur in the X-direction and/or Y-direction in the event of a crash and in the Z-direction during normal operation of the vehicle.

Figure 2A:
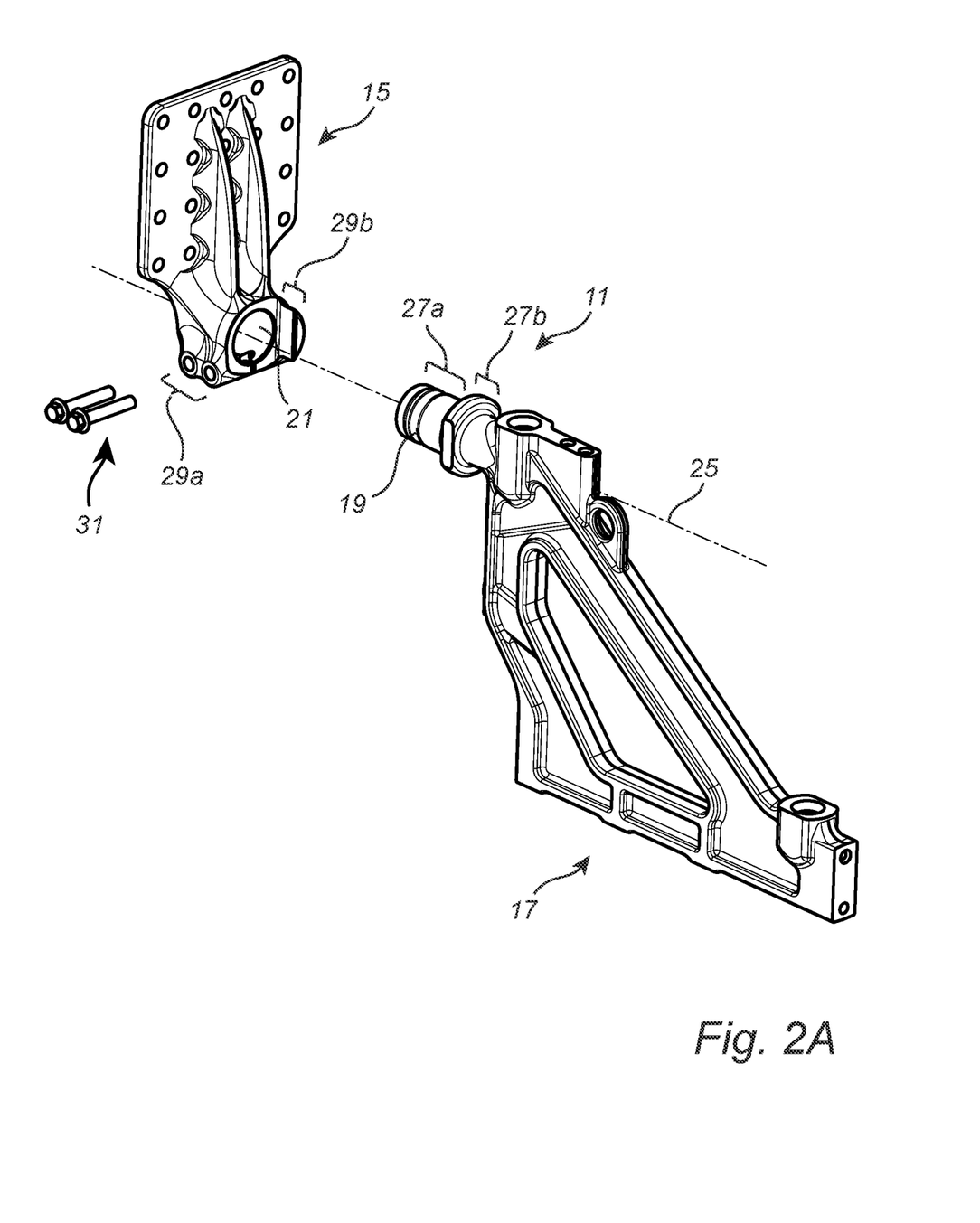
FIGS. 2A-B are different views of a first example configuration of the battery module support arrangement comprised in the chassis arrangement in FIG. 1B.
Figure 2B:
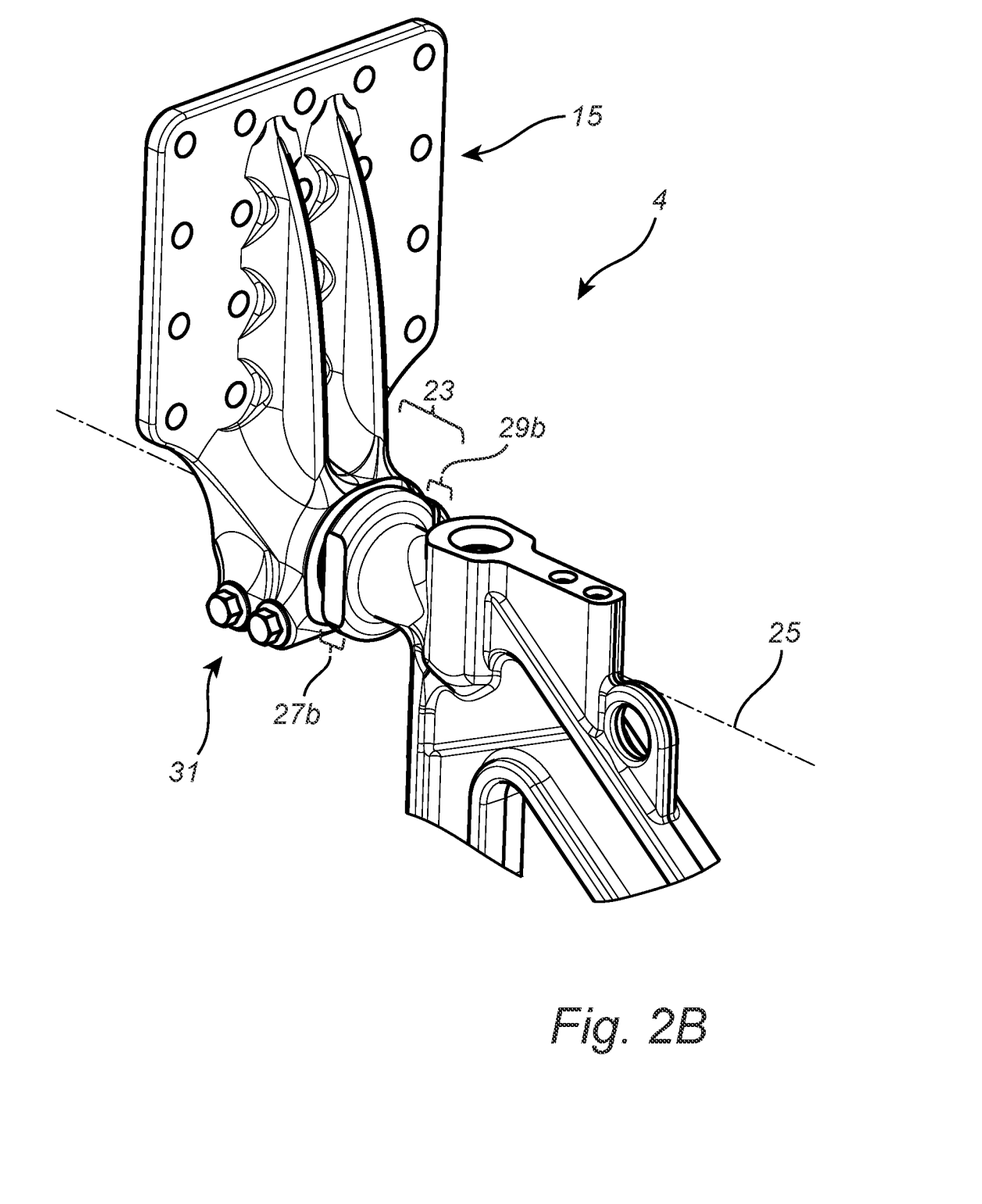

FIGS. 2A-B are different views of a first example configuration of the battery module support arrangement comprised in the chassis arrangement in FIG. 1B.

Referring first to FIG. 2A, the battery module support arrangement 11, according to this first example configuration, is shown in an exploded perspective view. As can be seen in FIG. 2A, the battery module support arrangement 11 comprises a rail attachment part 15 and a battery module attachment part 17. The battery module attachment part 17 comprises a stub 19, and the rail attachment part 15 comprises a stub seat 21. When the stub 19 is inserted into and releasably attached to the stub seat 21, a stub connection 23 (see FIG. 2B) is formed. The stub connection 23 extends in an axial direction 25, which is parallel to the Y-axis in the vehicle coordinate system, as is schematically indicated in FIG. 1B.

FIG. 2B shows the stub connection 23 that is formed when the stub 19 has been inserted in and releasably attached to the stub seat 21. In the first example configuration shown in FIGS. 2A-B, the stub 19 has a first portion 27a in which a cross-section between the stub 19 and a plane perpendicular to the axial extension 25 of the stub connection 23 is circular, and a second portion 27b in which the cross-section between the stub 19 and a plane perpendicular to the axial extension 25 of the stub connection 23 is non-circular. Correspondingly, the stub seat 21 has a first portion 29a in which a cross-section between the stub seat 21 and a plane perpendicular to the axial extension 25 of the stub connection 23 is circular, and a second portion 29b in which the cross-section between the stub seat 21 and a plane perpendicular to the axial extension 25 of the stub connection 23 is non-circular. As is schematically shown in FIG. 2B, the second portion 29b of the stub seat 21 accommodates the second portion 27b of the stub 19 in such a way that rotation of the stub 19 in relation to the stub seat 21 is prevented by interaction between the second portion of the stub 27b and the second portion 29b of the stub seat 21.

Accordingly, the portion of the stub connection 23 formed by the interacting second portion 27b of the stub 19 and second portion 29b of the stub seat 21 constitute locking means for locking the stub 19 in the stub seat 21. As can be seen in FIG. 2A and FIG. 2B, the stub connection 23 comprises additional locking means, here in the form of bolts 31. Before the bolts 31 are tightened, the stub 19 can be inserted in the stub seat 21, but after tightening the bolts 31, axial movement of the stub 19 in relation to the stub seat 21 is prevented.

In this context, it should be noted that the stub connection 23 should be dimensioned in view of the anticipated load. For the example configuration in FIGS. 1A-B with a total battery module mass of around 4000 kg and a total of 8 battery module support arrangements 11 supporting the battery modules 9, it has been found that an axial extension of the portion of the stud 19 that is inserted in the stud seat 21 may suitably be in the range of 40 mm to 100 mm, and particularly advantageously in the range of 65 mm to 85 mm. Furthermore, a diameter of the smallest circle circumscribing the stub 19 may suitably be in the range of 40 mm to 80 mm. Furthermore, the stub 19 may suitably be tubular with a wall thickness in the range 7 mm to 17 mm. As will be understood by one of ordinary skill in the art, these dimensions are typically interrelated, and suitable combinations of dimensions can be arrived at by simulation and testing.

Figure 3A:
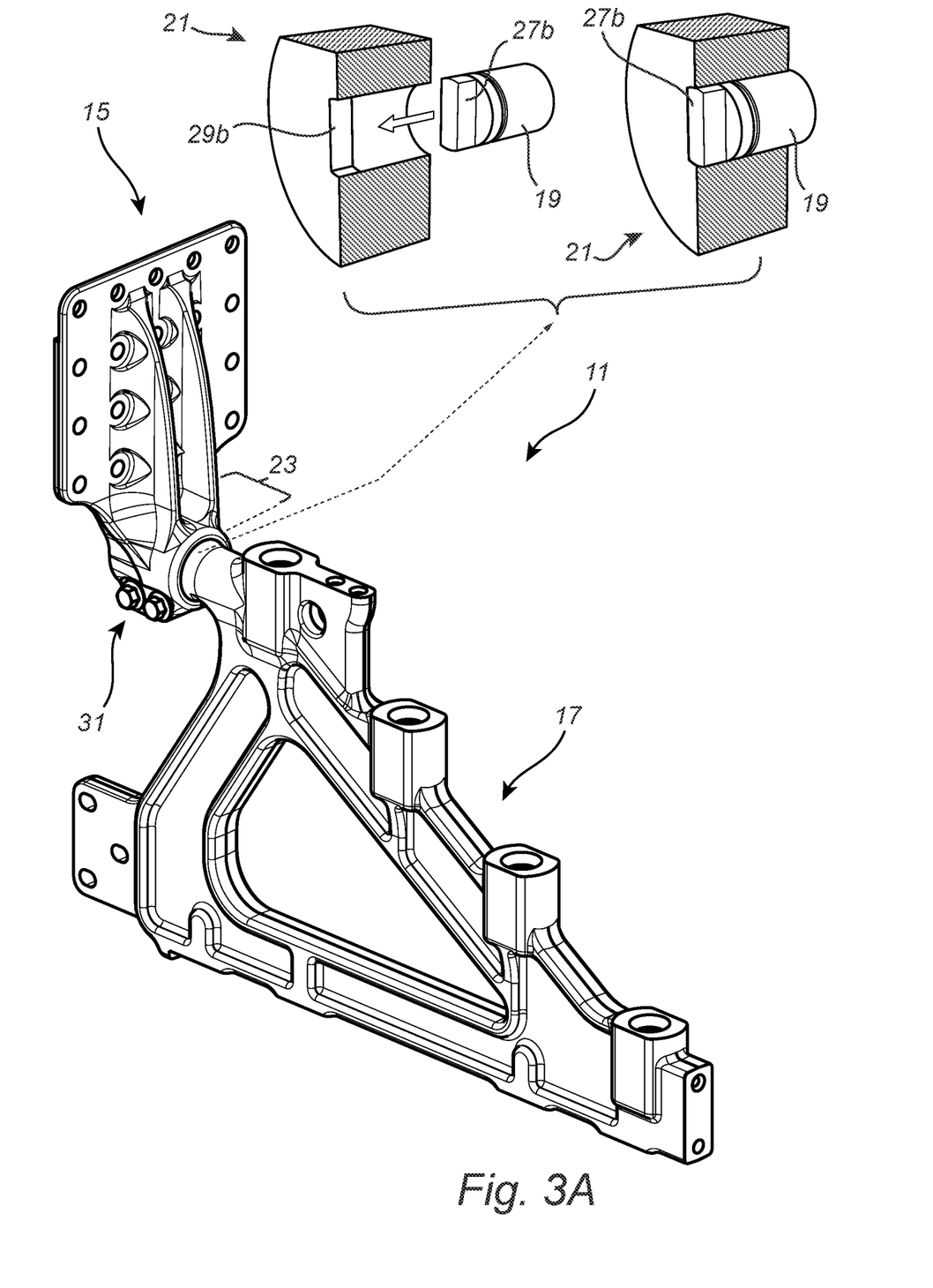
FIGS. 3A-B are different views of a second example configuration of the battery module support arrangement comprised in the chassis arrangement in FIG. 1B.
Figure 3B:
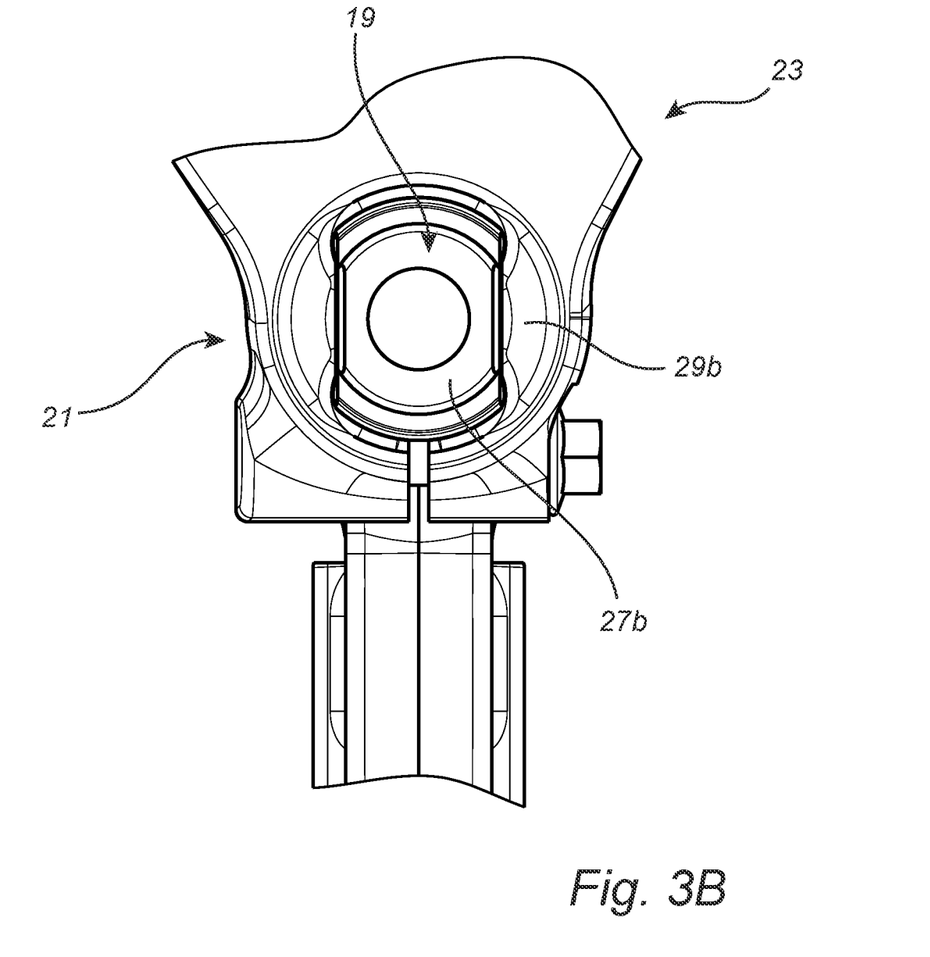

FIGS. 3A-B are different views of a second example configuration of the battery module support arrangement 11 comprised in the chassis arrangement in FIG. 1B.

The second example configuration of the battery module support arrangement 11 in FIGS. 3A-B mainly differs from the first example configuration described above with reference to FIGS. 2A-B in that the second portion 27b of the stub 19 providing for rotational locking of the stub 19 in relation to the stub seat 21 is arranged at the free end of the stub 19. This can best be seen in FIG. 3B, which is a plane view of the stub connection 23 as seen along the axial extension 25 of the stub connection 23. An advantage of the second example configuration in FIGS. 3A-B over the first example configuration in FIGS. 2A-B is that the second portion, 29b of the stub seat 21, can be made symmetrical so that identical rail attachment parts 15 can be used on both sides of the chassis arrangement 3.

Figure 4A:
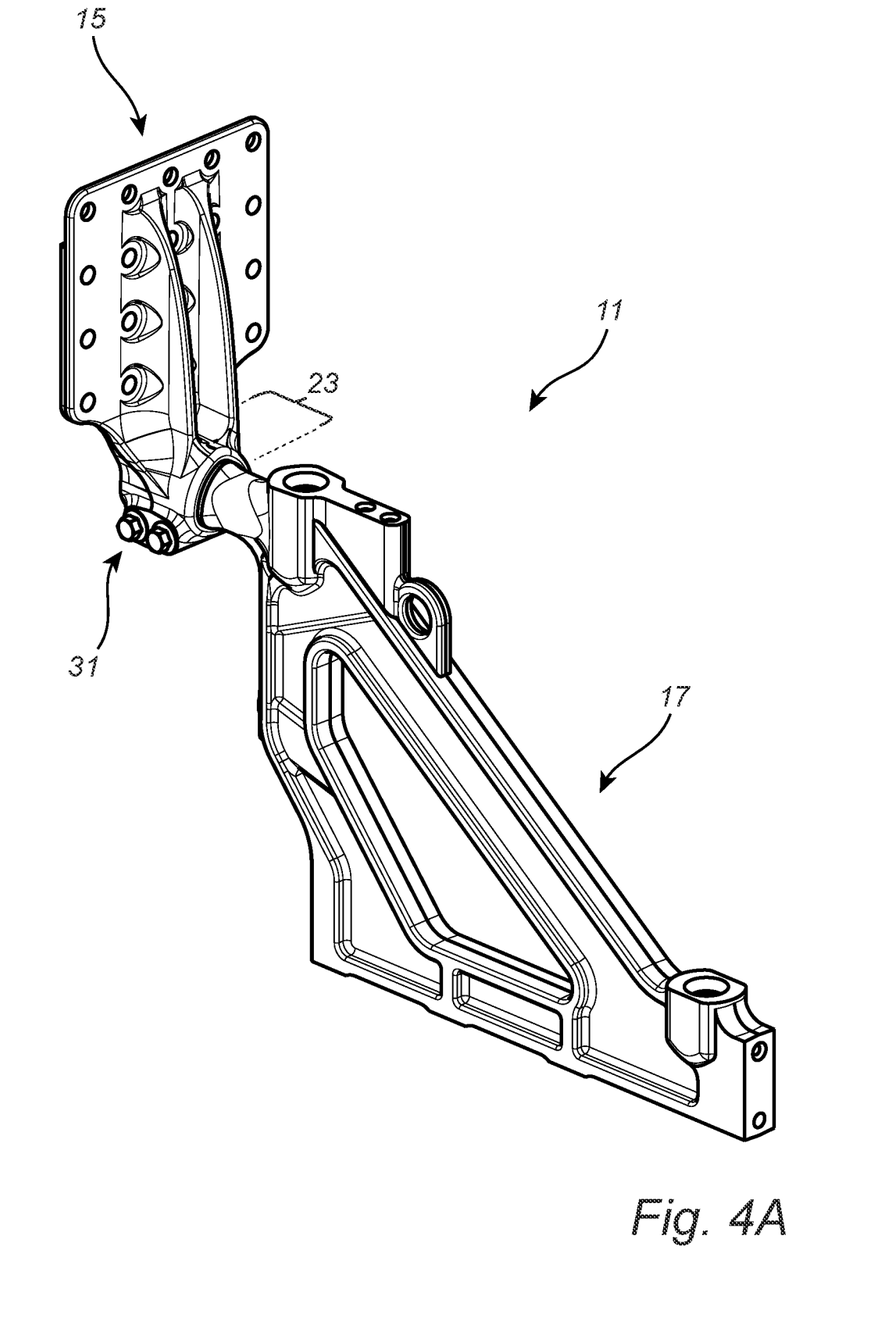
FIGS. 4A-B are different views of a third example configuration of the battery module support arrangement comprised in the chassis arrangement in FIG. 1B.
Figure 4B:
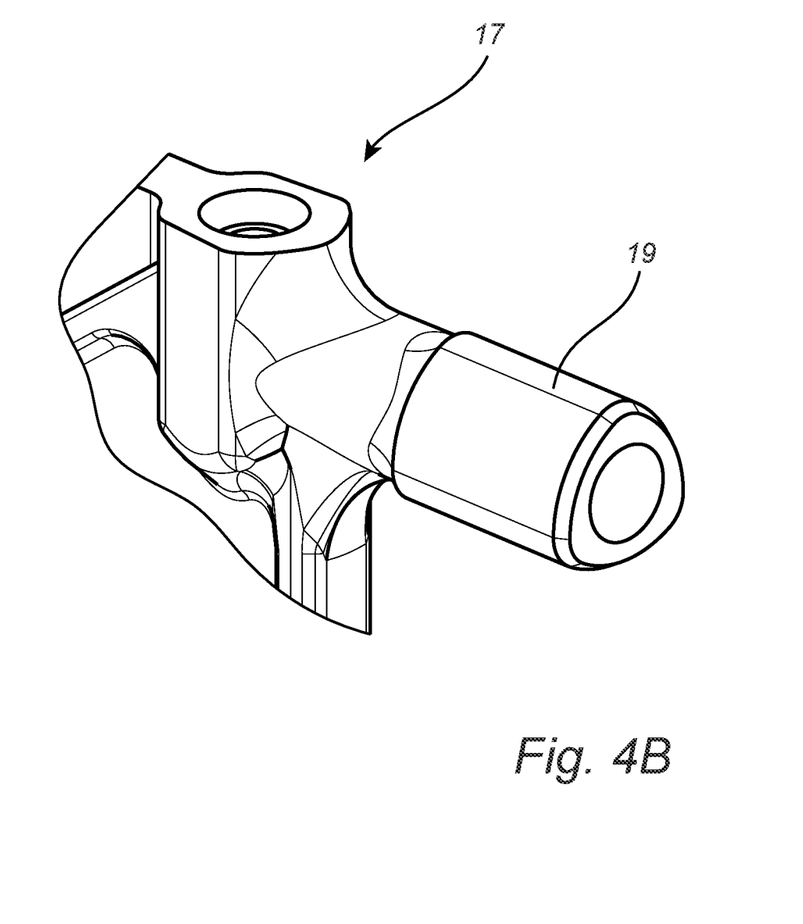

FIGS. 4A-B are different views of a third example configuration of the battery module support arrangement comprised in the chassis arrangement in FIG. 1B.

The third example configuration of the battery module support arrangement 11 in FIGS. 4A-B mainly differs from the first and second example configurations described above in that the entire stub 19 (and stub seat 21) has a non-circular cross-section. In the particular example in FIGS. 4A-B, the stub 19 has a cross-section outline in the form of a polygon with rounded corners, here a P3G polygon profile as defined by the standard DIN 32711-1:2009. It should, however, be noted that many other rounded polygonal cross-sections may be suitable and that the P3G polygon profile is merely an example. Through the rounded polygonal shape, the desired load carrying properties of the stub connection 23 can be combined with a rotational lock provided along the length of the overlap between the stub 19 and the stub seat 21.

Figure 5:
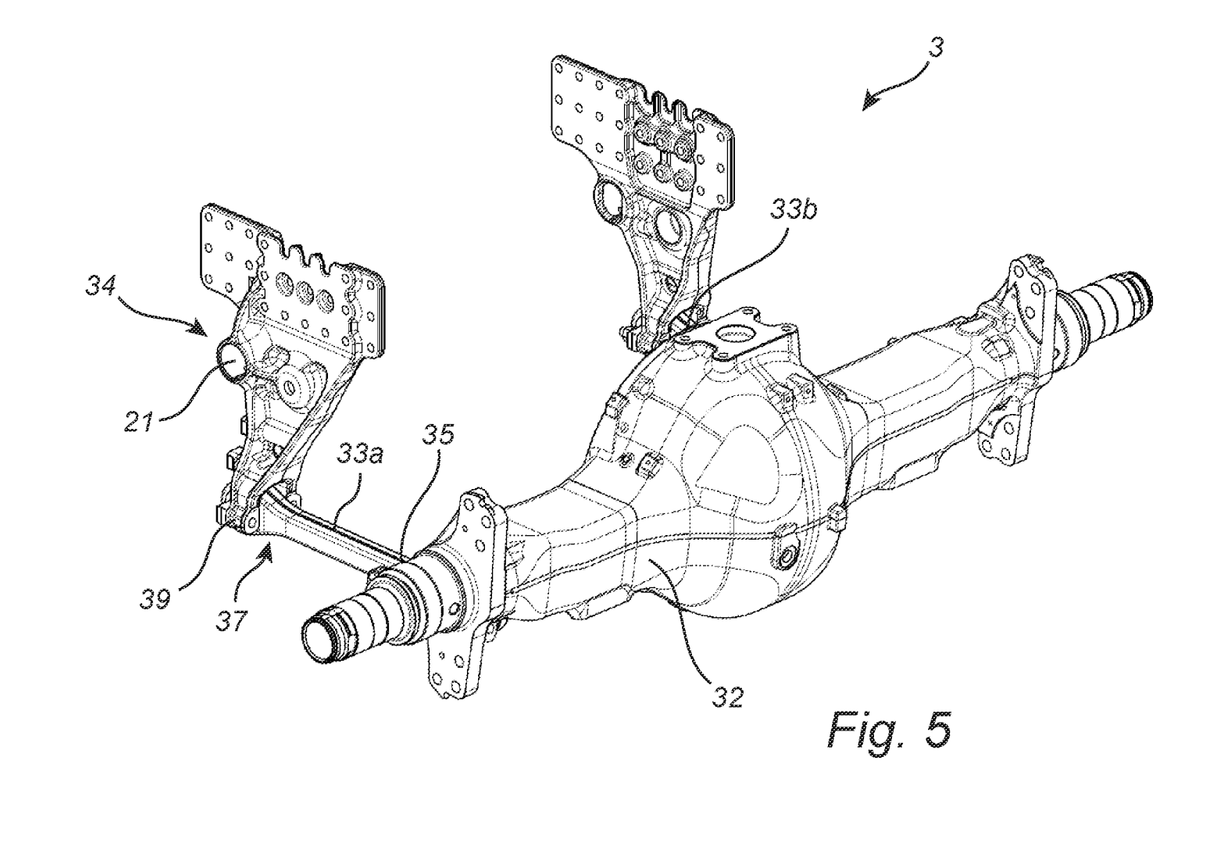
FIG. 5 illustrates a fourth example configuration of the battery module support arrangement comprised in the chassis arrangement in FIG. 1B.

FIG. 5 illustrates a fourth example configuration of the battery module support arrangement comprised in the chassis arrangement in FIG. 1B. FIG. 5 schematically shows a portion of the chassis arrangement 3, including a rear axle 32 and reaction rods 33a-b. Each reaction rod 33a-b has a first end 35 and a second end 37 (only shown for one of the reaction rods). The first end 35 of each reaction rod 33a-b is coupled to the rear axle 32.

Valuable space in the chassis arrangement 3 can be saved by providing rail attachment parts 34 serving to both join with respective battery module attachment parts 17 (not shown in FIG. 5) and hold the second end 37 or each reaction rod 33a-b. To achieve this, each rail attachment part 34 comprises a reaction rod holder 39, in addition to the stub seat 21.

It is to be understood that the present invention is not limited to the embodiments described above and illustrated in the drawings; rather, the skilled person will recognize that many changes and modifications may be made within the scope of the appended claims. For example, the stub 19 may be included in the rail attachment part 15, and the stub seat 21 may be included in the battery module attachment part 17.

The invention claimed is:

1. A chassis arrangement for an electrified heavy vehicle, the chassis arrangement comprising:
   a chassis frame with at least one rail extending in a longitudinal direction of the chassis arrangement;
   at least one battery module for propulsion of the heavy vehicle; and
   a battery module support arrangement including a rail attachment part attached to the rail, and a battery module attachment part attached to the battery module, the battery module attachment part being releasably connected to the rail attachment part by a laterally extending stub connection, extending perpendicular to the longitudinal direction of the chassis arrangement, the stub connection including a stub inserted in and releasably attached to a stub seat.

2. The chassis arrangement of claim 1, wherein the stub connection includes a lock for locking the stub in the stub seat.

3. The chassis arrangement of claim 1, wherein the rail attachment part comprises one of the stub and the stub seat, and the battery module attachment part comprises the other one of the stub and the stub seat.

4. The chassis arrangement of claim 1, wherein a cross-section between the stub and a plane perpendicular to an axial extension of the stub connection forms a continuous closed curve.

5. The chassis arrangement of claim 4, wherein the closed curve is elliptical.

6. The chassis arrangement of claim 5, wherein:
   the stub has a first portion along the axial extension of the stub connection in which the cross-section between the stub and a plane perpendicular to the axial extension is circular, and a second portion along the axial extension of the stub connection in which the cross-section between the stub and a plane perpendicular to the axial extension is non-circular; and
   the stub seat has a portion configured to accommodate the second portion of the stub in such a way that rotation of the stub in relation to the stub seat is prevented by interaction between the second portion of the stub and the portion of the stub seat.

7. The chassis arrangement of claim 4, wherein the closed curve forms a polygon with rounded corners.

8. The chassis arrangement of claim 1, wherein the rail attachment part is attached to the rail by a bolted connection, a riveted connection, or a combination of a bolted and a riveted connection.

9. The chassis arrangement of claim 1, wherein:
the chassis arrangement comprises a rear axle and a reaction rod having a first end coupled to the rear axle; and
the rail attachment part includes a reaction rod holder holding a second end of the reaction rod.

10. An electrified heavy vehicle comprising:
a chassis arrangement for an electrified heavy vehicle, the chassis arrangement comprising:
  a chassis frame with at least one rail extending in a longitudinal direction of the chassis arrangement;
  a rear axle and a reaction rod having a first end coupled to the rear axle;
  at least one battery module for propulsion of the heavy vehicle; and
  a battery module support arrangement including a rail attachment part attached to the rail, and a battery module attachment part attached to the battery module, the battery module attachment part being releasably connected to the rail attachment part by a laterally extending stub connection including a stub inserted in and releasably attached to a stub seat, the rail attachment part includes a reaction rod holder holding a second end of the reaction rod; and
a vehicle body supported by the chassis arrangement.

* * * * *